US012083786B1

(12) United States Patent
Morin

(10) Patent No.: US 12,083,786 B1
(45) Date of Patent: Sep. 10, 2024

(54) PRESSURE SELF-ADJUSTMENT APPARATUS

(71) Applicant: Mark W. Morin, Attleboro, MA (US)

(72) Inventor: Mark W. Morin, Attleboro, MA (US)

(73) Assignee: GEO KNIGHT & CO., INC., Brockton, MA (US)

( * ) Notice: Subject to any disclaimer, the term of this patent is extended or adjusted under 35 U.S.C. 154(b) by 0 days.

(21) Appl. No.: 18/206,800

(22) Filed: Jun. 7, 2023

Related U.S. Application Data

(60) Provisional application No. 63/430,808, filed on Dec. 7, 2022.

(51) Int. Cl.
*B41F 16/00* (2006.01)

(52) U.S. Cl.
CPC ........ *B41F 16/0046* (2013.01); *B41F 16/008* (2013.01)

(58) Field of Classification Search
CPC ........................... B41F 16/008; B41F 16/0046
See application file for complete search history.

(56) References Cited

U.S. PATENT DOCUMENTS

| | | | | |
|---|---|---|---|---|
| 4,954,203 | A * | 9/1990 | Matsumoto ............ | B65H 3/124 156/542 |
| 5,296,081 | A | 3/1994 | Morin et al. | |
| 7,739,918 | B1 * | 6/2010 | LaPeyronnie .......... | G01N 19/04 73/827 |
| 9,120,326 | B2 | 9/2015 | Will et al. | |
| 9,446,599 | B2 | 9/2016 | Will et al. | |
| 9,962,979 | B2 | 5/2018 | Will et al. | |
| 2007/0041270 | A1 * | 2/2007 | Morris .................. | G01F 23/226 366/279 |
| 2007/0209763 | A1 | 9/2007 | Chen | |
| 2008/0202366 | A1 * | 8/2008 | Nagata ..................... | B41K 3/20 101/316 |
| 2011/0036175 | A1 * | 2/2011 | Land, III ............... | H01H 33/26 73/723 |
| 2011/0088387 | A1 * | 4/2011 | Von Behrens .......... | F03G 7/065 60/527 |

* cited by examiner

*Primary Examiner* — David H Banh
(74) *Attorney, Agent, or Firm* — John P. McGonagle

(57) ABSTRACT

A pressure self-adjustment apparatus within a heat press to close a heating assembly containing a drinkware product. The apparatus has an electric linear actuator with a motor driving a gear box driving a piston rod against a heating assembly. The actuator is connected to a die spring providing compression against the linear actuator. A limit switch is positioned beneath the die spring and positioned to engage the linear actuator when it compresses the die spring a desired amount.

1 Claim, 3 Drawing Sheets

PRESSURE SELF-ADJUSTMENT APPARATUS

CROSS-REFERENCE TO RELATED APPLICATIONS

Applicant claims the priority benefits of U.S. Provisional Application No. 63/430,808, filed Dec. 7, 2022.

BACKGROUND OF THE INVENTION

This invention relates to thermal transfer presses, and more particularly to an apparatus for adjusting pressure regardless of varying product diameter.

Heat transfer printing is the printing of sublimation transfers, plastisol and other ink type transfers, as well as images created using specially coated papers fed through color copy machines and other color printers, onto objects by heating and thermal transfer. The heat transfer process involves transferring printed transfers by heat and contact pressure. In order to print using thermal transfers, a properly prepared transfer must be held in tight contact with the receptive surface while heat is applied. The heat and pressure must continue for a sufficient time to allow the sublimation process to complete itself.

Traditional sublimation printing of product objects, such as mugs, cups, and drinkware, require different pressure and tension adjustments of the heat press for product objects of different diameter. This pressure setting is traditionally adjusted manually by an operator in order to achieve the proper locking and clamping force on the product object, or in the case of automatic presses, by using pneumatics with a regulator that is adjusted by the operator. Since drinkware may have different diameters, precise manual adjustment of pressure is difficult and requires direct operator attention.

SUMMARY OF THE INVENTION

To overcome the limitations of the prior art, the present invention provides an apparatus to automatically adjust pressure to accommodate different diameter products. A wide range of different diameter products can be pressed at the same optimal pressure in a mechanism automatically without operator attention or user adjustment and without pneumatics. The present invention provides a counter-pressure die spring design that compresses based on resistance by the product to the heater closing around it.

Regardless of the diameter of the drinkware, the same exact compression of the die spring is achieved through a limit switch set to an exact distance from the actuator to signal when the ideal countering force and spring compression is achieved, regardless of product size.

Using only a counter-spring without the limit switch determination of the same travel distance would result in different pressures and undesirable results. By compressing the die spring to a specific length until the limit switch is triggered, a range of different diameter products can be pressed at the same pressure without adjustment to accommodate the size of the product object.

Traditional drinkware heat presses all must be adjusted for pressure each time a different sized drinkware product is placed within the heat press. The present invention is unique in that no manual pressure adjustment is required regardless of drinkware size.

These together with other objects of the invention, along with various features of novelty which characterize the invention, are pointed out with particularity in this disclosure. For a better understanding of the invention, its operating advantages and the specific objects attained by its uses, reference should be made to the accompanying drawings and descriptive matter in which there is illustrated a preferred embodiment of the invention.

DETAILED DESCRIPTION OF THE INVENTION

Figure 1:
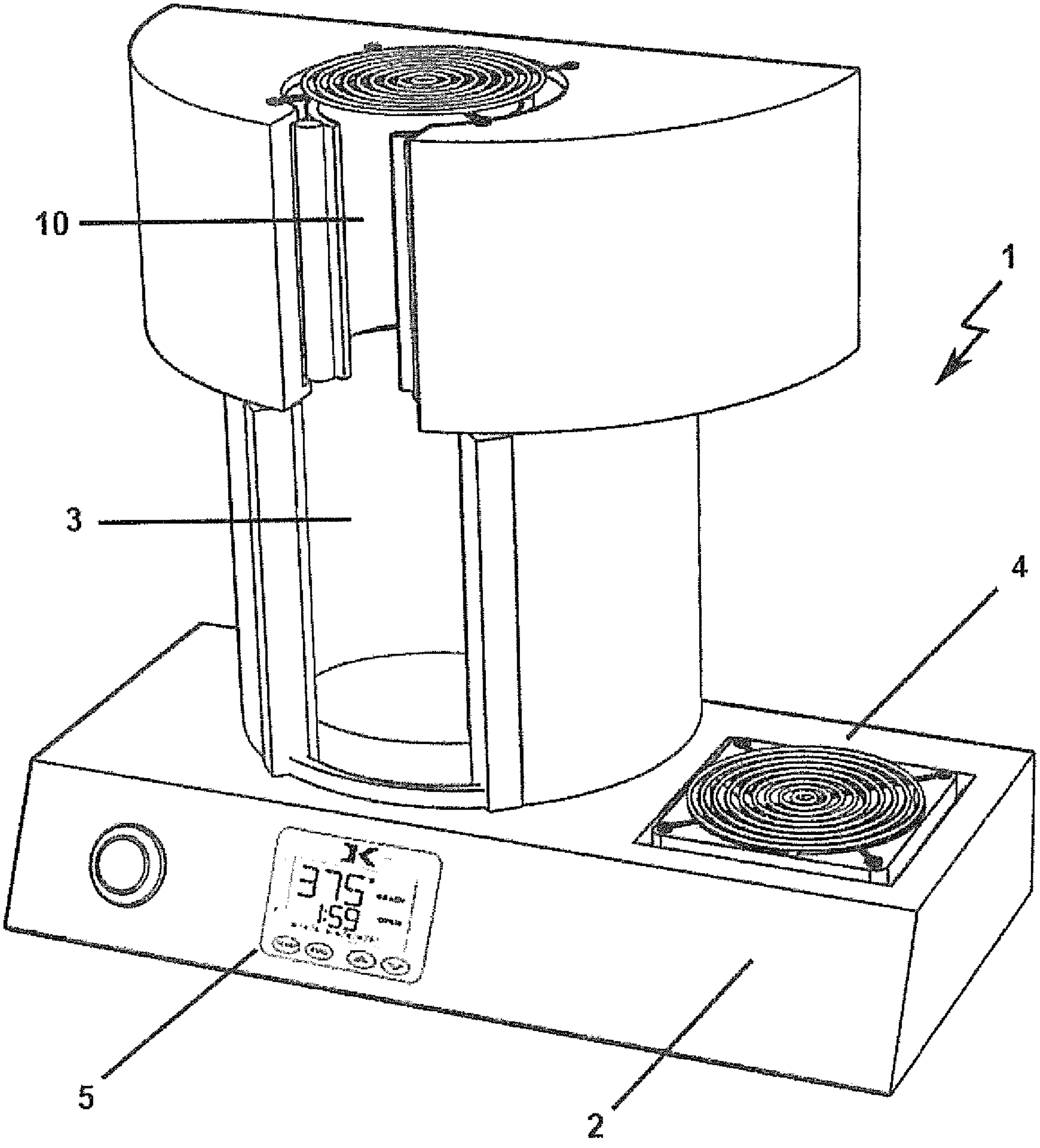
FIG. 1 is a perspective view of a typical thermal transfer press.

Referring to the drawings wherein like elements are indicated buy like numerals, there is shown an apparatus constructed according to the method of the invention. Referring more particularly to FIG. 1, there is shown a typical heat press 1 with a heater assembly 10 above a padded cooling chamber 3. Thermal presses designed for heat transfer printing have a heater assembly 10 for applying heat and pressure to the drinkware product to be printed. The heater is physically isolated from the remaining press parts. A cooling fan 4 may be incorporated into a heat press housing 2 in a convenient location. A drinkware product (not shown) is inserted into the heater assembly 10 wherein a pressing and heat print cycle is executed. At the end of the cycle, a logic controller 5 signals the heating assembly to release the drinkware product, dropping it into the cooling chamber 3.

Figure 2:
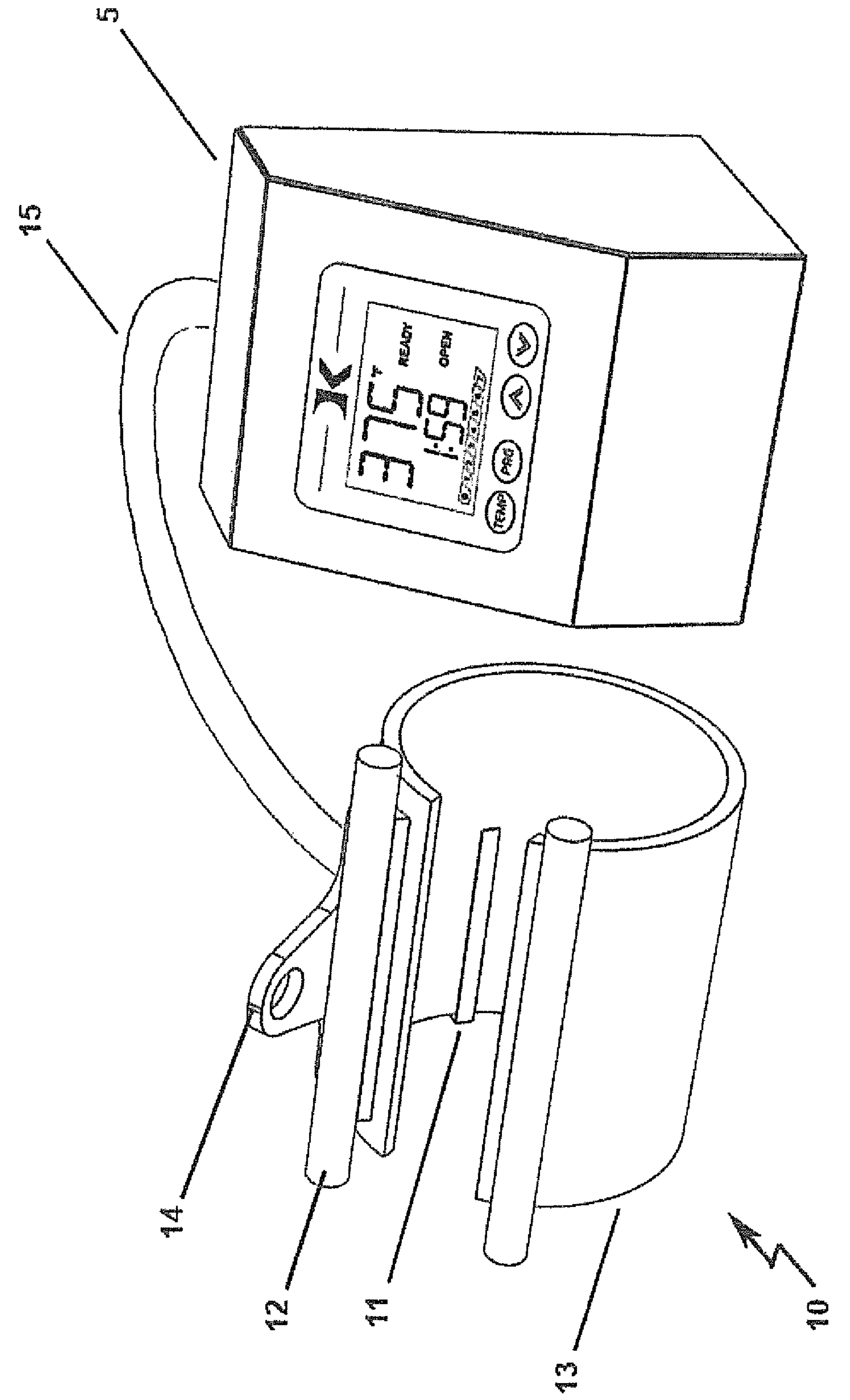
FIG. 2 is a perspective view of the thermal transfer press heater assembly and logic controller.

Referring more particularly to FIG. 2, there is shown the heater assembly 10 without the heating press housing. The heater assembly is continuously monitored by the logic controller 5. A drinkware product (not shown) is inserted into the heater assembly 10 by an operator and closed manually or automatically under pressure. The heater assembly 10 may be at any temperature state, i.e., cool temperature, warm temperature, or any temperature in between. The logic controller 5 senses a starting temperature through a thermocouple temperature sensor 11 and records starting temperature when the drinkware product is fully clamped in the heater assembly 10. The logic controller determines a timing cycle value and set point temperature by referencing a table of time and temperature values for the drinkware product to be printed. The logic controller 5 powers the heater assembly 10 via a wire harness 15 to bring the starting temperature to the set point temperature. The logic controller 5 begins a timing cycle, specific to the particular product object, for the printing process once a set point temperature, unique to the particular drinkware product, is reached, said logic controller maintaining said set point temperature during the timing cycle. At the end of the timing cycle, the printed drinkware product is released from the heater assembly.

Figure 3:
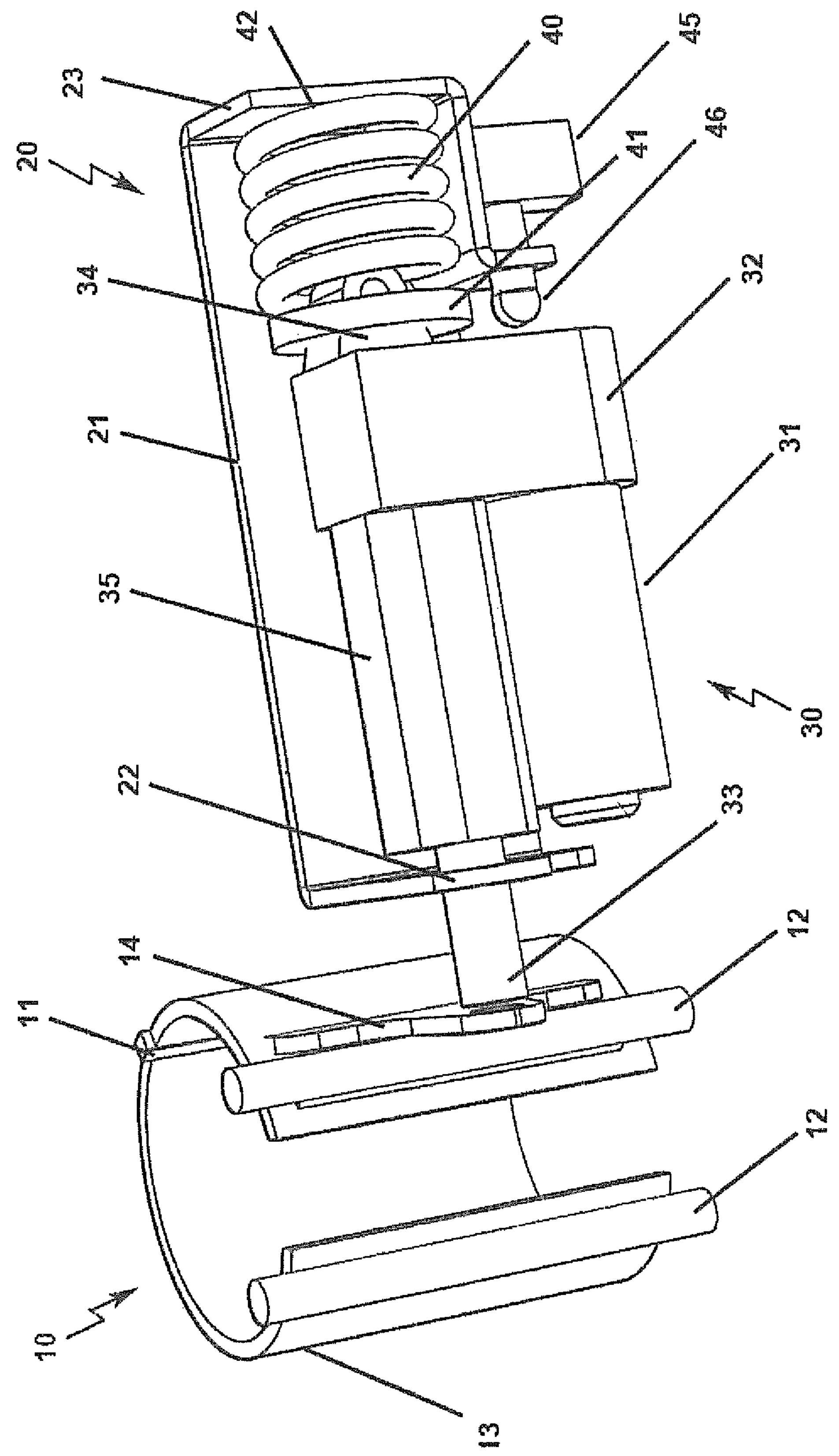
FIG. 3 is a perspective view of the heater assembly with pressure self-adjustment apparatus.

Referring to FIG. 3, there is shown the heater assembly 10 with pressure self-adjustment apparatus 20 contained within an apparatus bracket 21. The apparatus 20 is comprised in part of an electric linear actuator 30 having a motor 31 driving a gear box 32 driving a piston rod 33 contained within an actuator housing 35. The piston rod 33 protrudes through an apparatus bracket forward aperture 22 and connects to the heater-actuator interface element 14.

The apparatus 20 is further comprised of a die spring 40, said die spring being a high force compression spring engineered to consistently give predetermined pressure at a given compression. The die spring 40 provides compression along the longitudinal axis of the actuator piston rod 33. The die spring 40 has a forward end 41 connected to a linear actuator rear end 34. A die spring rear end 42 is fixed to an apparatus bracket rear 23.

The apparatus is further comprised of a limit switch 45 mounted beneath the die spring 40, said limit switch having a plunger trigger 46 with a longitudinal axis parallel to the longitudinal axis of the actuator piston rod 33 and compression axis of the die spring 40.

In operation, a drinkware product (not shown) is inserted into the heater assembly 10 by an operator. The operator activates a linear actuator 30 to begin closing the heater assembly 10 around the drinkware product by the linear actuator extending a piston rod 33 against the heater assembly 10. As the heater assembly band elements 12 compress against the drinkware product, the linear actuator body 31, 32, 35 is pushed against the die spring forward end 41, compressing the die spring 40 against the bracket rear 23. The die spring's compression applies increasing pressure against the linear actuator and thereby the heater assembly with the product object. As the linear actuator piston rod 33 forces the linear actuator body away from the heater assembly against the die spring 40, the linear actuator body eventually engages the limit switch plunger 46 pushing the plunger into the limit switch 45 immediately stopping the voltage to the actuator. This signals a cut off command to the linear actuator and the heater assembly stops closing.

The end result is that regardless of the product object diameter, a constant and fixed pressure is achieved without operator adjustment or intervention. The linear actuator will continue to apply increased pressure to the heater assembly and product object contained therein until the limit switch is reached. The die spring pressure rating along with the distance between actuator body and limit switch determines the specific pressure applied to the product object. The continued collapse of the die spring until the limit switch is triggered ensures the consistent pressure required for proper sublimation for a wide diameter range of products.

It is understood that the above-described embodiment is merely illustrative of the application. Other embodiments may be readily devised by those skilled in the art which will embody the principles of the invention and fall within the spirit and scope thereof.

I claim:

1. A heat transfer press for imprinting sublimation transfers onto a drinkware product, said heat transfer press having a heater assembly for applying heat and pressure to the drinkware product to be imprinted and a pressure self-adjustment apparatus contained within an apparatus bracket, comprising:

an electric linear actuator having a motor driving a gear box driving a piston rod contained within a linear actuator housing, said piston rod protruding through a forward aperture of the apparatus bracket and an interface element of the heater assembly;

a die spring providing compression coincident with an actuator piston rod longitudinal axis, said die spring having a forward end connected to a linear actuator rear end, said die spring having a rear end fixed to a rear of the apparatus bracket; and a limit switch mounted beneath the die spring, said limit switch having a plunger trigger with a longitudinal axis parallel to the longitudinal axis of the actuator piston rod and compression axis of the die spring, said plunger trigger adapted to engage the linear actuator rear, said plunger trigger adapted to switching off power to the linear actuator when pressed into the limit switch.

* * * * *